UNITED STATES PATENT OFFICE.

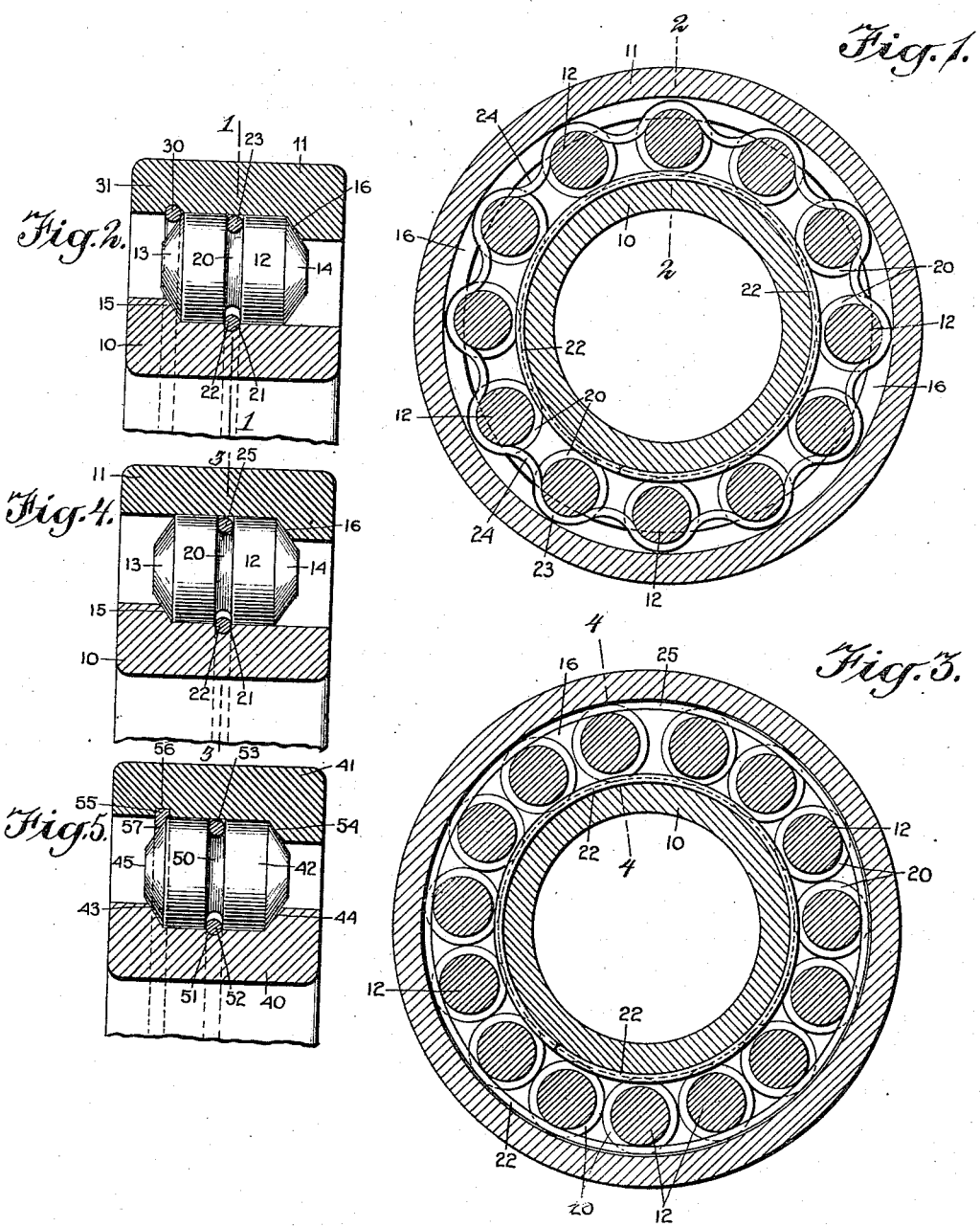

ASHER GOLDEN, OF BROOKLYN, NEW YORK.

ROLLER-BEARING.

1,285,125.

Specification of Letters Patent.   Patented Nov. 19, 1918.

Application filed October 5, 1917.   Serial No. 194,880.

*To all whom it may concern:*

Be it known that I, ASHER GOLDEN, a citizen of the United States, and a resident of the city of New York, borough of Brooklyn, in the county of Kings and State of New York, have invented a new and Improved Roller-Bearing, of which the following is a full, clear, and exact description.

The object of the invention is to provide a new and improved roller bearing which is simple and durable in construction and arranged to permit of conveniently handling the roller bearing as a unit and without danger of the rollers becoming displaced. Another object is to permit of conveniently assembling the parts to provide either a full type or a silent type of bearing.

In order to produce the desired result use is made of outer and inner bearing rings, rollers interposed between the said bearing rings, the said rollers and one of the said bearing rings having annular registering grooves, and a split ring engaging the said registering grooves to hold the rollers in assembled relation on the corresponding grooved bearing ring. Use is also made of integral shoulders on opposite sides of the bearing rings for the conical ends of the rollers to abut against, and use is further made of a second locking ring engaging the grooves of the rollers opposite the said retaining ring.

A practical embodiment of the invention is represented in the accompanying drawings forming a part of this specification, in which similar characters of reference indicate corresponding parts in all the views.

Figure 1 is a cross section of a roller bearing of the silent or separate type, the section being on the line 1—1 of Fig. 2;

Fig. 2 is an enlarged sectional side elevation of the same on the line 2—2 of Fig. 1;

Fig. 3 is a cross section of a roller bearing of the full type, the section being on the line 3—3 of Fig. 4;

Fig. 4 is an enlarged sectional side elevation of the same on the line 4—4 of Fig. 3; and Fig. 5 is a similar view of a modified form of the roller bearing.

Between the inner and outer bearing rings 10 and 11 are interposed bearing rollers 12 having conical ends 13, 14 abutting against the beveled inner faces of annular shoulders 15 and 16 formed integrally on opposite sides of the bearing rings 10 and 11. The bearing rollers 12 are further provided with annular grooves 20 in register with an annular groove 21 formed in the peripheral face of the inner bearing ring 10, and the said registering grooves 20 and 21 are engaged by a retaining ring 22 preferably circular in cross section and having one half fitting into the groove 21 and the other half into the grooves 20 of the several rollers 12. Another ring 23 engages the registering grooves 20 of the rollers 12 adjacent the inner face of the outer bearing ring 11 to securely hold the rollers 12 in assembled position on the inner bearing ring 10. For roller bearings of the silent type, as shown in Fig. 1, the ring 23 is provided with corrugated portions 24 to hold the rollers 12 spaced apart, but for roller bearings of the full type, as shown in Fig. 3, a plain ring 25 is used, it being understood that in this case the rollers contact with each other at their peripheral faces. By reference to the drawings it will be noticed that the grooves 20 are sufficiently deep to accommodate the ring 23 or 25 to prevent the same from undesirable contact with the inner surface of the outer bearing ring 11. It is understood that by the use of the ring 23 or 25 the rollers 12 are held firmly in place on the inner bearing ring 10 in conjunction with the ring 22 thus forming a unit which can be readily handled without danger of displacing the rollers.

If desired, a thrust ring 30 is placed in a groove 31 formed on the inner surface of the outer bearing ring 11 at the side opposite the one having the annular shoulder 16, and this ring 30 abuts with its outer portion against the conical end 13 of the rollers 12 directly opposite the annular shoulder 15 thus providing a thrust bearing at one side only. A full thrust bearing in both directions is disclosed in Fig. 5, in which the outer and inner bearing rings 40 and 41 have rollers 42 interposed between the same, and the inner ring 40 is provided at opposite sides with annular integral shoulders 43, and 44 engaged by the conical ends 45 and 46 of the rollers 42. The rollers 42 are provided with annular grooves 50 in register with corresponding grooves 51, and the said grooves 50 and 51 are engaged by a ring 52 similar to the ring 21 previously mentioned. A ring 53 engages the grooves 50 adjacent the inner surface of the bearing ring 41, and this ring has the same function as the ring 25 above referred to. The outer bearing 41 is provided at one side with an annular integral shoulder 54 engaged by the conical end 46, and the other conical end 45 engages a thrust ring 55 held in a groove 56 in the inner surface of the outer bearing ring 41. The thrust ring 55 is provided with a beveled inner face 57 fitting the conical end 45. Thus the shoulders 43, 44 and 54 and the thrust ring 55 form thrust bearings for the rollers 42 interposed between the inner and outer rings 40 and 41.

The roller bearing shown and described is very simple and durable in construction and the several parts can be readily assembled. It will also be noticed that when the extra ring 30 or 55 is used the bearing in its entirety can be handled as a unit, that is, the inner ring and the outer ring are not demountable unless such ring is first removed.

Having thus described my invention, I claim as new and desire to secure by Letters Patent:—

1. A roller bearing, comprising inner and outer bearing rings provided on opposite sides with annular shoulders, rollers interposed between the said bearing rings and having their ends engaging the said shoulders and provided with a central peripheral groove, and retaining means engaging the peripheral grooves of the rollers, holding the same in assembled position on one of the bearing rings.

2. A roller bearing, comprising inner and outer bearing rings, rollers interposed between the said bearing rings, the said rollers and one of the said bearing rings having central peripheral annular registering grooves, and a split ring engaging the said registering grooves to hold the rollers in assembled relation on the corresponding grooved bearing.

3. A roller bearing, comprising inner and outer bearing rings provided on opposite sides with integral annular shoulders, rollers interposed between the said bearing rings and having their ends engaging the said shoulders and provided with central peripheral grooves, one of the said bearing rings and the said rollers having an annular groove registering with the peripheral groove of the rollers, and a retaining ring engaging the said registering grooves.

4. A roller bearing, comprising inner and outer bearing rings provided on opposite sides with annular shoulders, rollers interposed between the said bearing rings having a central peripheral groove and having their ends engaging the said shoulders, one of the said bearing rings and the said rollers having an annular groove registering with the peripheral grooves of the rollers, a retaining ring engaging the said registering grooves, and a thrust ring engaging one of the said bearing rings at the side opposite the one having the shoulder, the thrust ring engaging the corresponding end of the rollers.

5. A roller bearing comprising inner and outer bearing rings provided on opposite sides of their opposing faces with symmetrically disposed beveled annular shoulders, cylindrical rollers having the opposite ends similarly beveled, and engaging said shoulders, and retaining means engaging said rollers to maintain them against longitudinal movement.

6. A roller bearing comprising inner and outer bearing rings provided on opposite sides of their opposing faces with symmetrically disposed beveled annular shoulders, cylindrical rollers having their opposite ends similarly beveled, one of said rings having an annular groove in the end opposite to the shouldered end, and a thrust ring carried in said groove, engaging a beveled end of said rollers.

7. A roller bearing comprising inner and outer bearing rings provided on opposite sides of their opposing faces with integral annular shoulders, a plurality of rollers having a central groove, and their ends abutting said annular shoulders, and an undulated ring seated in the central annular grooves of the rollers, the troughs of the undulations of the ring extending between the rollers and separating them from each other.

ASHER GOLDEN.